Aug. 28, 1951  G. A. LYNN  2,565,695
ADJUSTABLE SAFETY SEAT
Filed Aug. 10, 1946
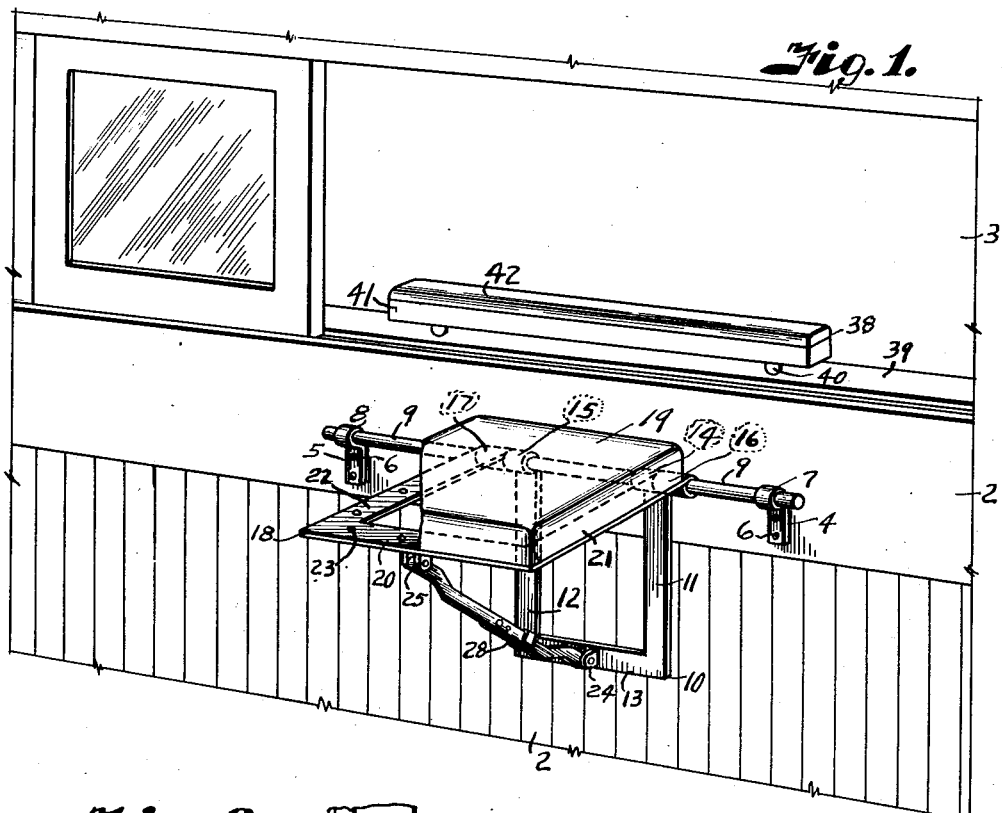
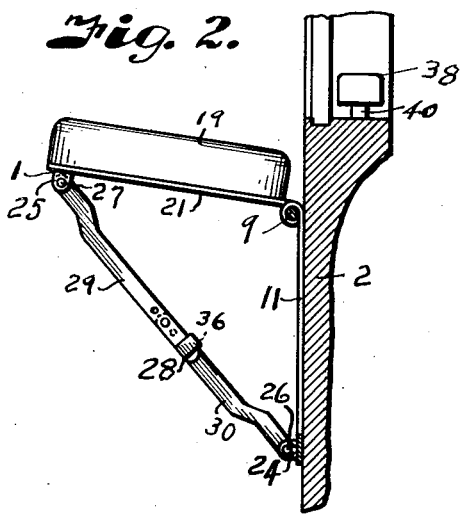
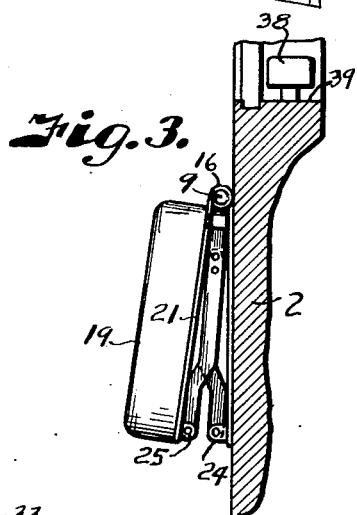
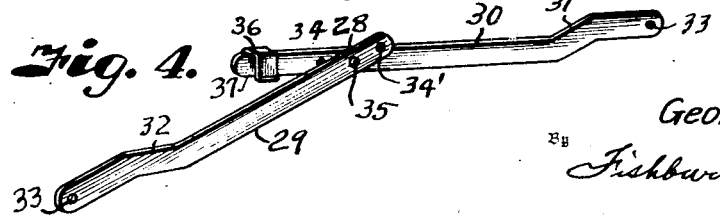
Inventor
George A. Lynn
By Fishburn & Mullendore
Attorneys Patented Aug. 28, 1951

2,565,695

UNITED STATES PATENT OFFICE 2,565,695

ADJUSTABLE SAFETY SEAT

George A. Lynn, Kansas City, Mo.

Application August 10, 1946, Serial No. 689,745

1 Claim. (Cl. 155—83)

This invention relates to an adjustable safety seat, and more particularly to seats for use in cabs of locomotives or the like.

The principal objects of the present invention are to provide a cushioned seat adjustable forwardly or backwardly on the side of the cab of the locomotive, particularly for use by engineers or motormen, said seat being held in adjusted position by weight of the user; to provide a seat member and a cushioned supporting structure whereby the seat member can be adjusted to various angular positions with respect to the supporting structure; to provide a seat which can be lowered to lie alongside the cab out of the way of the user; to provide for adjustment of height of the outer edge of the seat; to provide a device which may be readily installed in the locomotive or other place for use; and to provide a device of this character simple, economical to manufacture, strong, durable, compact and efficient in operation.

In accomplishing these and other objects of the present invention, I have provided improved details of structure, the preferred form of which is illustrated in the accompanying drawings wherein:

Fig. 1 is a perspective view of my invention with parts broken away and some parts shown in dotted lines to better illustrate the invention.

Fig. 2 is a side elevational view of the seat in raised position shown attached to the cab.

Fig. 3 is a side view of the device with the seat in lowered position.

Fig. 4 is a perspective view of the supporting and adjustable brace for the seat.

Referring more in detail to the drawings:

I designates an adjustable seat embodying the features of my invention adapted to be attached to the side 2 of the cab underneath a window opening 3 of a locomotive cab or the like.

The device consists of a pair of brackets 4 and 5 secured to the side 2 of the cab by screws, bolts or the like 6. The brackets have their upper ends bent to form loops 7 and 8 adapted to receive the ends of a support rod 9 to which the seat proper is slidably attached as will presently be described. The loops are adapted to engage the rod sufficiently tight to prevent the rod from sliding in the loops.

10 designates a substantially U-shaped bracket member comprising an arm 11 and 12 and a connecting arm 13, the side arms having their upper ends turned to form loops or bearing members 14 and 15 to loosely engage the rod 9 so as to allow the bracket to slide thereon, and the arm 13 will engage the side 2 of the cab.

Also slidably carried by the rod 9 by loops or bearing members 16 and 17 is a base member 18 for a cushioned seat 19 which may be of any suitable structure. The base 18 has an outer cross arm 20 and side arms 21 and 22 having their opposite ends 20 terminating in the bearing members 16 and 17 which engage the rod on the outside of the loops 7 and 8 carried by the bracket member 10. The base member 18 is provided with a plurality of openings 23 adapted to receive screws or the like for engaging in the seat 19 to secure the seat on the base member.

Secured to the arm 13 of the U-shaped member 10 and to the arm 20 of the base 18 substantially midway thereof by welding or other suitable means are ears 24 and 25 having openings adapted to receive bolts or the like 26 and 27 for pivotally securing thereto the respective ends of a brace member 28 adapted to hold the seat in raised position and collapsible to lower the seat alongside the cab. The brace comprises arms 29 and 30 having their respective ends angled as indicated at 31 and 32 so that when the device is lowered to the position shown in Fig. 3, the arms will lie alongside each other and the seat will be substantially in vertical position. The inner ends of the arms 29 and 30 are hinged together so that they will pivot and may be folded. The outer ends of the arms are provided with openings 33 in which the bolts 26 and 27 engage for fastening the brace to the ears 24 and 25. The inner ends of the arms 29 and 30 have a plurality of openings 34 and 34' and a bolt 35 engages in such openings to pivotally secure the arms together. A bracket member 36 is secured to the inner end 37 of the arm 30 providing a keeper in which the arm 29 will engage to prevent the arm 29 from passing the arm 30 when the seat is in raised position. The openings 34 and 34' allow for adjusting the height of the seat to the user.

An arm rest 38 is secured to the sill 39 of the window opening 3 by suitable supporting members 40 as best illustrated in Fig. 2. The arm rest has a base member 41 of substantially the same length as the rod 9 and is provided with a cushioning member 42 on the upper side thereof to provide the arm rest.

While I have described the bracket member 10 and base member 18 as being substantially U-shaped, I do not wish to be limited to the U-shaped structure as it will be obvious that V-shaped or any other desired structure may be employed without departing from the spirit of my invention. Likewise, any suitable adjustable brace may be employed for the brace 28.

It will be obvious from the foregoing that I have provided an improved adjustable safety seat for locomotive cabs or the like which may be adjusted longitudinally of the cab to suit the user and also may be adjusted in height. It also may be folded out of the way of the user when not in use as illustrated in Fig. 3.

What I claim and desire to secure by Letters Patent is:

A foldable seat for a locomotive cab or the like comprising, an elongated support secured horizontally on the inside of said cab, a vertical bracket member of substantially U-shape having arms provided with loops engaging said support and slidable thereon and having its lower end engaging the side of said cab, a similarly shaped bracket member having arms provided with loops engaging said support adjacent said loops on said vertical bracket and slidable on said support, a pair of arms pivotally connected together near one end thereof, the outer end of one of the arms being pivotally secured to the lower portion of the vertical bracket and the outer end of the other arm being pivotally secured to the outer portion of said second named bracket, a cushion seat on said second named bracket, means on said arms for adjusting the tilt of said second named bracket when the seat is in horizontal position, and a U-shaped keeper on the pivoted end of one of said arms for receiving the other arm when in seat supporting position, said second named bracket and seat being adapted to fold down alongside said vertical bracket, said arms having inclined portions adjacent their outer ends to allow the major portion of the arms to lie alongside each other when in folded position.

GEORGE A. LYNN.

REFERENCES CITED

The following references are of record in the file of this patent:

UNITED STATES PATENTS

| Number | Name | Date |
|---|---|---|
| 1,415,711 | Roberts | May 9, 1922 |
| 1,664,958 | Zeiser | Apr. 3, 1928 |